(12) United States Patent
Bhan

(10) Patent No.: US 12,048,917 B2
(45) Date of Patent: Jul. 30, 2024

(54) HEAVY HYDROCARBON HYDROPROCESSING CATALYST AND METHODS OF MAKING AND USING THEREOF

(71) Applicant: SHELL OIL COMPANY, Houston, TX (US)

(72) Inventor: Opinder Kishan Bhan, Bellaire, TX (US)

(73) Assignee: SHELL USA, INC., Houston, TX (US)

( * ) Notice: Subject to any disclaimer, the term of this patent is extended or adjusted under 35 U.S.C. 154(b) by 87 days.

(21) Appl. No.: 17/463,887

(22) Filed: Sep. 1, 2021

(65) Prior Publication Data

US 2022/0062871 A1    Mar. 3, 2022

Related U.S. Application Data

(60) Provisional application No. 63/073,015, filed on Sep. 1, 2020.

(51) Int. Cl.
*B01J 23/883* (2006.01)
*B01J 8/18* (2006.01)
(Continued)

(52) U.S. Cl.
CPC .......... *B01J 23/883* (2013.01); *B01J 8/1845* (2013.01); *B01J 31/06* (2013.01); *B01J 35/647* (2024.01);
(Continued)

(58) Field of Classification Search
None
See application file for complete search history.

(56) References Cited

U.S. PATENT DOCUMENTS

| | | |
|---|---|---|
| 4,485,008 A | 11/1984 | Maa et al. |
| 4,738,944 A | 4/1988 | Robinson et al. |

(Continued)

FOREIGN PATENT DOCUMENTS

| | | |
|---|---|---|
| EP | 0204354 A1 | 12/1986 |
| EP | 0342759 A1 | 11/1989 |

(Continued)

OTHER PUBLICATIONS

International Search Report and Written Opinion received for PCT Patent Application No. PCT/US2013/065222, mailed on Jan. 30, 2014, 17 pages.

(Continued)

*Primary Examiner* — Colin W. Slifka
(74) *Attorney, Agent, or Firm* — SHELL USA, INC.

(57) ABSTRACT

The specification discloses a highly macroporous catalyst for hydroprocessing and hydroconversion of heavy hydrocarbon feedstocks. The high macroporosity catalyst incudes an inorganic oxide, molybdenum, and nickel components. It has a pore structure such that at least 18% of its total pore volume is in pores of a diameter greater than 5,000 angstroms and at least 25% of its total pore volume is in pores of a diameter greater than 1,000 angstroms. Preferably, the pore structure is bimodal. The catalyst is made by co-mulling the catalytic components with a high molecular weight polyacrylamide followed by forming the co-mulled mixture into a particle or an extrudate. The particle or extrudate is dried and calcined under controlled calcination temperature conditions to yield a calcined particle or extrudate of the high macroporosity catalyst composition.

6 Claims, 1 Drawing Sheet

(51) Int. Cl.
  B01J 31/06    (2006.01)
  B01J 35/64    (2024.01)
  B01J 35/69    (2024.01)
  B01J 37/00    (2006.01)
  B01J 37/04    (2006.01)
  B01J 37/08    (2006.01)
  C10G 45/08    (2006.01)
  C10G 45/20    (2006.01)

(52) U.S. Cl.
  CPC ........... *B01J 35/651* (2024.01); *B01J 35/653* (2024.01); *B01J 35/657* (2024.01); *B01J 35/69* (2024.01); *B01J 37/0027* (2013.01); *B01J 37/04* (2013.01); *B01J 37/082* (2013.01); *C10G 45/08* (2013.01); *C10G 45/20* (2013.01); *C10G 2300/202* (2013.01); *C10G 2300/308* (2013.01); *C10G 2300/4006* (2013.01); *C10G 2300/4012* (2013.01); *C10G 2300/4018* (2013.01); *C10G 2300/70* (2013.01)

(56) References Cited

U.S. PATENT DOCUMENTS

| | | | |
|---|---|---|---|
| 4,906,357 | A | 3/1990 | Drori |
| 7,708,058 | B1 | 5/2010 | Gipson |
| 7,820,036 | B2 | 10/2010 | Bhan |
| 7,824,541 | B2 | 11/2010 | Bhan |
| 7,871,513 | B1 | 1/2011 | Bhan |
| 9,114,386 | B2 | 8/2015 | Bhan |
| 9,879,187 | B2 | 1/2018 | Bhan |
| 2008/0050792 | A1 | 2/2008 | Zmierczak et al. |
| 2008/0308280 | A1 | 12/2008 | Head |
| 2009/0056953 | A1 | 3/2009 | Korach et al. |
| 2009/0255850 | A1 | 10/2009 | Bhan et al. |
| 2010/0000908 | A1 | 1/2010 | Markkanen et al. |
| 2010/0017496 | A1 | 1/2010 | Kimmel et al. |
| 2010/0025823 | A1 | 2/2010 | Collazo et al. |
| 2010/0126727 | A1 | 5/2010 | Vinegar et al. |
| 2010/0326888 | A1 | 12/2010 | Xu et al. |
| 2011/0068047 | A1 | 3/2011 | Gudde et al. |
| 2011/0073523 | A1 | 3/2011 | Cui et al. |
| 2011/0124497 | A1 | 5/2011 | Bhan |
| 2011/0210045 | A1 | 9/2011 | Kou et al. |
| 2013/0284640 | A1* | 10/2013 | Bhan .................. B01J 27/19 208/216 PP |

FOREIGN PATENT DOCUMENTS

| | | |
|---|---|---|
| EP | 2182047 A1 | 5/2010 |
| WO | 0011112 A1 | 3/2000 |
| WO | 2006029456 A1 | 3/2006 |
| WO | 2009034045 A1 | 3/2009 |
| WO | 2010000908 A1 | 1/2010 |
| WO | 2010111168 A2 | 9/2010 |
| WO | 2010121367 A1 | 10/2010 |
| WO | 2013063219 A1 | 5/2013 |
| WO | 2013063223 A1 | 5/2013 |
| WO | 2016073560 A1 | 5/2016 |
| WO | 2017189390 A1 | 11/2017 |

OTHER PUBLICATIONS

Van Der Drift et al., " Entrained Flow Gasification of Biomass-Ash Behavior", Feeding Issues and System Analysis, Apr. 2, 2004, 58 pages.

International Search Report and Written Opinion received for PCT Patent Application No. PCT/US2021/048625, Mailed on Dec. 6, 2021, 12 pages.

* cited by examiner

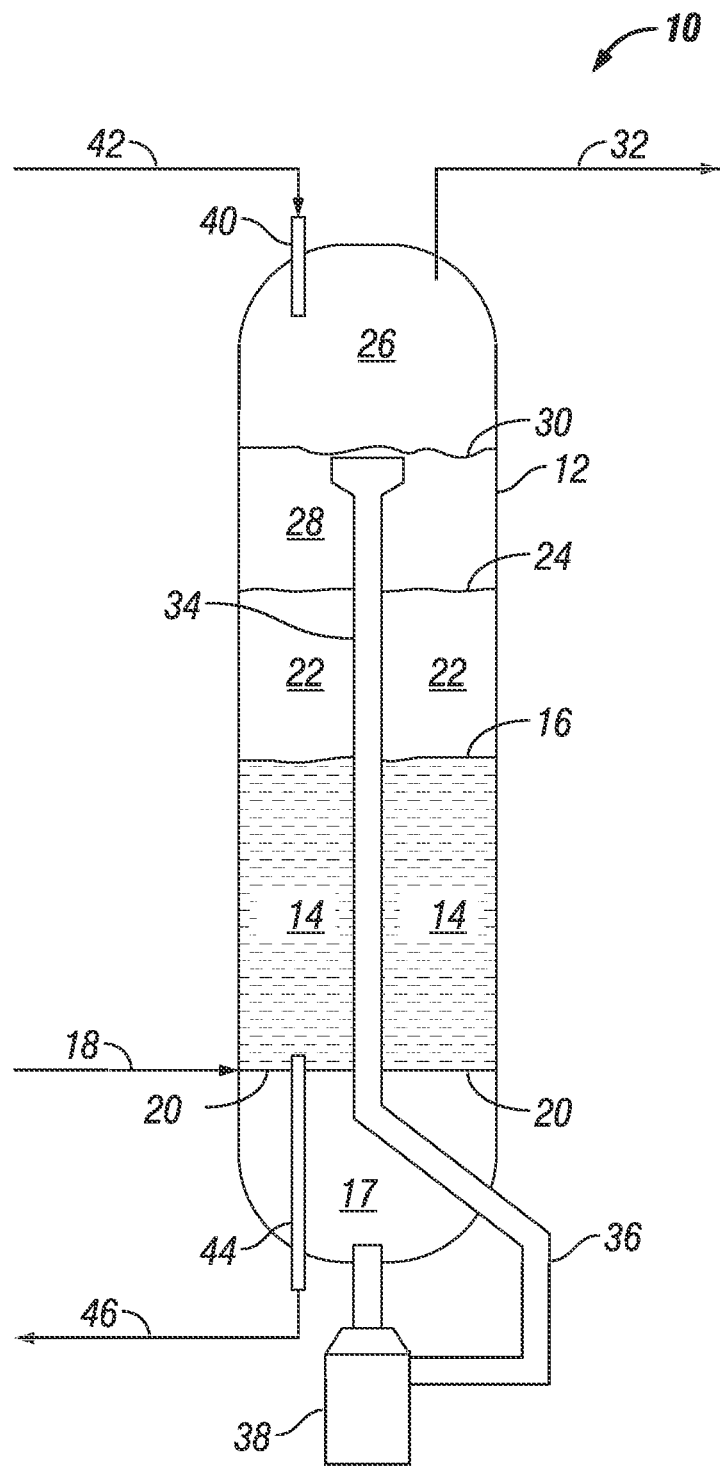

HEAVY HYDROCARBON HYDROPROCESSING CATALYST AND METHODS OF MAKING AND USING THEREOF

REFERENCE TO RELATED APPLICATION

The present application claims the benefit from the priority of U.S. Provisional Patent Application Ser. No. 63/073,015, entitled "A HEAVY HYDROCARBON HYDROPROCESSING CATALYST AND METHOD OF MAKING AND USING THEREOF," filed Sep. 1, 2020, and is hereby incorporated by reference in its entirety.

This disclosure relates to a hydroprocessing catalyst useful in hydrodesulfurization of heavy hydrocarbon feedstocks and the hydroconversion of heavy ends to distillates. The disclosure further relates to a method of making a hydroprocessing catalyst.

BACKGROUND OF THE DISCLOSURE

In the processing of refinery crude oil certain cuts that include heavy hydrocarbons boiling above about 538° C. (1,000° F.) are subjected to catalytic hydroprocessing to remove components such as sulfur, nitrogen, metals, and micro-carbon residue by desulfurization, denitrogenation, demetallization and to convert heavy ends to lighter distillate fractions. These processes use various types of heterogeneous hydroprocessing catalysts to promote the reactions by contacting the catalyst with feedstock under conditions of elevated temperature and pressure in the presence of hydrogen. Many of the conventional catalysts used to provide for hydroconversion and desulfurization of heavy hydrocarbon feedstocks contain a Group VIB metal component, such as molybdenum, and a Group VIII metal component, such as cobalt or nickel, supported on a refractory oxide support.

U.S. Pat. No. 7,820,036 (Bhan) discloses a catalyst found to be useful in hydroprocessing heavy hydrocarbon feedstocks. This catalyst is especially useful in hydrodesulfurization and hydroconversion of heavy hydrocarbon feedstocks and in maintaining stability even when used at the higher process temperature conditions required for high conversion of the heavier hydrocarbon fractions. The catalyst is made by mixing molybdenum trioxide, a nickel compound and an inorganic oxide material and forming the mixture into particles that are calcined. The catalyst has up to 12 weight percent (as metal) molybdenum and up to 4 weight percent (as metal) nickel. Important features of the catalyst are that it has a mean pore diameter that is in a specific, narrow range and low macroporosity. The mean pore diameter of the catalyst disclosed herein is in the range of from 85 Å to 100 Å. The macroporosity of the catalyst is less than 4.5 percent of the total pore volume that is contained in pores of a diameter greater than 350 Å. There is no mention of the use of a high molecular weight polyacrylamide in the preparation of the catalyst to make one having a high macroporosity and enhanced catalytic properties.

Disclosed in U.S. Pat. No. 9,114,386 (Bhan) is a catalyst for use in hydroprocessing heavy hydrocarbon feedstocks. This catalyst has a unique self-activating property such that its activity increases with use. The catalyst has relatively low concentrations of catalytic metals of molybdenum and nickel with the nickel in proportions providing for a low nickel-to-molybdenum weight ratio. The catalyst contains from 1 to 10 weight percent (as metal) molybdenum and nickel in an amount such that the weight ratio of nickel-to-molybdenum is less than 0.4. The catalyst is characterized as having at least 1 percent and less than 10 percent of its total pore volume in pores of diameter greater than 1,000 Å. The mesopores having diameters in the range of from 70 Å to 150 Å include least 40% but less than 70% of the total pore volume of the catalyst. It is desirable for at least 10 percent of the total pore volume to be present in pores having diameters in the range of from 130 Å to 300 Å. There is no mention of the use of a high molecular weight polyacrylamide in the preparation of the catalyst to make one having a high macroporosity pore structure such that at least 20% of its total pore volume is in pores of a diameter greater than 5,000 Å and enhanced catalytic properties.

U.S. Pat. No. 9,879,187 (Bhan) discloses another heavy hydrocarbon hydroprocessing catalyst that has excellent catalytic performance properties. This catalyst yields a treated product having enhanced product stability as reflected by its P-value. The catalyst further has enhanced MCR removal activity and enhanced vanadium removal capability and stability. The patent indicates that the unique physical characteristics of the catalyst provide for its excellent catalytic properties. An important feature of the catalyst is that at least 20% of its total pore volume is contained in the pores having pore diameters greater than 5,000 Å and less than 70% of the total pore volume is contained in pore diameters in the range of from 70 Å to 250 Å. There is no mention of the use of a high molecular weight polyacrylamide in the preparation of the catalyst to make one having a high macroporosity and enhanced catalytic properties.

SUMMARY

There is a continuing effort to develop improved catalysts for use in hydrotreating and hydroconversion of heavy hydrocarbons to yield hydrotreated conversion products. These efforts are directed to developing improved catalysts having higher activities and that provide for significant conversion of the pitch component of heavy hydrocarbon streams to lighter hydrocarbons while providing for low sediment yields.

Accordingly, provided is an ebullating bed catalyst, comprising alumina in the range of from 75 to 98.5 wt. %, based on the weight of the ebullating bed catalyst, a molybdenum component in an amount greater than 5 wt. %, calculated as metal and based on the weight of the ebullating bed catalyst, a nickel component in an amount such that the ebullating bed catalyst has an atomic ratio of nickel-to-molybdenum in the range of from 0.2 to 0.9. The ebullating bed catalyst has a high macroporosity pore structure such that at least 20% of the total pore volume of the ebullating bed catalyst is in pores of a diameter greater than 5,000 Å and at least 25% of the total pore volume of the ebullating bed catalyst is in pores of a diameter greater than 1,000 Å.

Provided, also, is a novel method of making an ebullating bed catalyst having a high macroporosity and that is useful for converting and treating a heavy hydrocarbon feed with a minimum of sediment yield. This method includes co-mulling a molybdenum compound, catalyst fines, alumina, a high molecular weight polyacrylamide component, and water to form a co-mulled mixture capable of being extruded. The co-mulled mixture is formed into extrudates which are dried to provide dried extrudates. The dried extrudates are calcined at a calcination temperature within the range of from 1450° F. to 1550° F. to thereby provide the ebullating bed catalyst disclosed herein. The ebullating bed catalyst has a high macroporosity pore structure such that at least 20% of the total pore volume of the ebullating bed catalyst is in pores of a diameter greater than 5,000 Å and at least 25% of the total pore volume of the ebullating bed catalyst is in pores of a diameter greater than 1,000 Å.

The disclosed ebullating bed hydroconversion catalyst and catalysts made by the method of the present disclosure may be used in a process for hydroconversion of heavy hydrocarbon feedstocks. This process includes introducing a heavy hydrocarbon feedstock into an ebullating bed reaction zone that contains a bed of the catalyst wherein it is contacted under hydroconversion conditions with the catalyst. A heavy hydrocarbon conversion product is yielded from the ebullating bed reaction zone.

BRIEF DESCRIPTION OF THE FIGURE

Advantages of the disclosure may become apparent upon reading the following detailed description and upon reference to the drawings in which the FIG. is a simplified schematic representation of certain aspects of the ebullated bed reactor system of the present disclosure.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount.

The catalyst of the present disclosure is a novel high macroporosity catalyst composition that is useful in hydroprocessing (e.g., hydrodesulfurization, hydrodenitrogenation, and hydrodemetallization) and hydroconversion of heavy hydrocarbon feedstocks. This catalyst has particular application as an ebullating bed catalyst used in ebullated bed process systems.

The catalyst disclosed herein is capable of providing for high conversion of the pitch portion of heavy hydrocarbon feedstocks to lower boiling hydrocarbons while yielding low amounts of undesirable sediment.

Use of high molecular weight polyacrylamide in the manufacture of the catalyst, and the special method steps, such as co-mulling and controlled calcination, used in preparation of the high macroporosity catalyst provide for much of the special properties of the high macroporosity catalyst.

While the high macroporosity and other pore structure characteristics of the catalyst are thought to contribute to the enhanced catalytic properties of the catalyst in the processing of heavy feedstocks, it is also thought that there are other physical properties of the high macroporosity catalyst resulting from the way it is made contribute its unique properties. The disclosed method of making the high porosity catalyst, thus, provides for the novel high macroporosity catalyst having its enhanced properties.

The catalyst of the present disclosure includes a particle. The particle may be an extrudate or any other particle or shape formed from a co-mulled mixture. The particle is calcined under a controlled calcination temperature condition to provide the calcined particle of the hydroprocessing catalyst with its unique pore structure.

The co-mulled mixture includes an inorganic oxide component, a molybdenum component, a nickel component, and a high molecular weight polyacrylamide. It is further desirable to include crushed catalyst fines in the mixture. These components are combined together in specifically defined concentrations and weight ratios required for the final calcined particle and the catalyst of the present disclosure.

The calcined particle further has a specifically defined pore structure as described in detail herein. The inclusion of the high molecular weight polyacrylamide in the co-mulled mixture provides for the final calcined particle, and thus the ebullated bed catalyst of the disclosure, having an exceptionally high macroporosity pore structure and other characteristics that contribute to enhanced catalytic properties.

Application of the high molecular weight polyacrylamide is important for making the ebullated bed catalyst having the described highly macroporous pore structure and enhanced catalytic properties. The amount of high molecular weight polyacrylamide included in the co-mulled mixture is controlled to provide a final catalyst having the required characteristics and properties. The amount of high molecular weight polyacrylamide included in the co-mulled mixture should be in the range of from about 0.1 wt. % up to about 10 wt. % of the total weight of the co-mulled mixture. It is preferred for the concentration of high molecular weight polyacrylamide of the co-mulled mixture to be in the range of from 0.2 to 8 wt. %, and, more preferred, the concentration is in the range of from 0.4 to 6 wt. %.

The calcined particle disclosed herein, in addition to the inorganic oxide component, includes either molybdenum or nickel, or both molybdenum and nickel. The concentrations of these metals in the final catalyst composition are important to the performance of the catalyst as well as using the high molecular weight polyacrylamide in the preparation of the catalyst to yield a catalyst with its unique physical properties. Thus, the calcined particle generally includes, consists essentially of, or consists of an inorganic oxide component, either a molybdenum component or a nickel component, or both a molybdenum component and nickel component.

The molybdenum content of the calcined particle and, thus, the hydroprocessing catalyst, should be greater than 5 weight percent (wt. %) of the total weight of the calcined particle, calculated as metal, regardless of its actual form, and less than 15 wt. %. It is more desirable for the molybdenum to be present in the calcined particle in an amount in the range of from 6 wt. % (i.e., 9 wt. %, calculated as $MoO_3$) to 14 wt. % (i.e., 21 wt. %, calculated as $MoO_3$). In a preferred embodiment, the concentration of molybdenum in the calcined particle is in the range of from 7 wt. % to 12 wt. % (i.e., from 10.5 wt. % to 18 wt. %, calculated as $MoO_3$).

The nickel content of the calcined particle, when present, should be in the range of from 0.5 to 5 wt. % of the total weight of the calcined particle, calculated as metal, regardless of its actual form (i.e., 0.64 to 6.4 wt. % on a nickel oxide (NiO) basis). Preferably, the nickel content is in the range of from 0.75 to 4.5 wt. % (i.e., 1 to 5.7 wt. % on a nickel oxide basis), and, more preferably, from 1 to 4 wt. % (i.e., 1.3 wt. % to 5.1 wt. % on a nickel oxide basis).

In an embodiment of the disclosed catalyst, it may be desirable for the calcined particle to have a nickel concentration in an amount such that the weight ratio of nickel-to-molybdenum in the calcined particle is in the range of from 0.2:1 to 0.9:1. This weight ratio is calculated and presented on an elemental basis. The amount of nickel, however, should be within a concentration range as expressed above and can be in certain embodiments in the range of from 0.3:1 to 0.8:1. A preferred weight ratio of nickel-to-molybdenum is in the range of from 0.3:1 to 0.6:1.

In addition to the molybdenum, nickel, and high molecular weight polyacrylamide components, the co-mulled mixture further includes an inorganic oxide material. Any suitable porous inorganic refractory oxide that will provide the pore structure properties required for the catalyst may be used as the inorganic oxide material component of the mixture. Examples of possible suitable types of porous inorganic refractory oxides include silica, alumina, and silica-alumina. Preferred is either alumina or silica-alumina. Most preferred is alumina.

The amount of inorganic oxide material in the mixture is to provide an amount in the range of from 70 to 92.5 weight percent inorganic oxide material in the final calcined mixture and hydroprocessing catalyst with the weight percent being based on the total weight of the calcined mixture or hydroprocessing catalyst. Preferably, the amount of inorganic oxide material in the calcined mixture is in the range of from 72 to 91 weight percent, and, most preferably, from 74 to 90 weight percent.

An important physical feature of the catalyst disclosed herein is that it has a relatively high macroporosity as hereafter described. A major portion of the total pore volume of the catalyst is contained in its pores having a diameter greater than 5,000 Å. In fact, at least 18% of the total pore volume of the calcined particle or catalyst should be in the pores having pore diameters greater than 5,000 Å. It is preferred, however, that at least 20%, and more preferred, at least 22% of the total pore volume is contained in the pores of a diameter of greater than 5,000 Å.

The high macroporosity catalyst has a bimodal pore structure. Its pore size distribution is such that it has a first pore diameter peak within the range of pore diameters of from 40 Å to 250 Å and a second pore diameter peak within the range of from 5,000 Å to 11,000 Å. The bimodal pore structure of the high macroporosity catalyst preferably can have a first pore diameter peak within the range of from 50 Å to 200 Å and its second pore diameter peak within the range of from 5,000 Å to 10,000 Å. More preferably, the first pore diameter peak is within the range of from 50 Å to 100 Å and the second pore diameter peak is within the range of from 5,000 Å to 9,000 Å.

The percentage of total pore volume of the catalyst contained in pores of diameters in the range of from 40 Å to 250 Å is in the range of from 50% to 70% of the total pore volume of the catalyst. It is preferred for from 45% to 65% of the total pore volume of the catalyst to be in its pores having diameters within the range of from 40 Å to 250 Å. More preferred, from 40% to 60% of the total pore volume is contained in the pores having diameters within the range of from 40 Å to 250 Å.

In preferred embodiments of the catalyst, at least 18% of total pore volume of the catalyst is contained in pores of diameters in the range of from 5,000 Å to 11,000 Å. Preferably, from 20% to 50% of the total pore volume of the catalyst is in its pores having diameters in the range of from 5,000 Å to 11,000 Å. More preferably, from 22% to 50% of the total pore volume is contained in pores having diameters within the range of from 5,000 Å to 11,000 Å.

It is further desirable for the pore structure of the catalyst to be such that at least 25 percent of the total pore volume is contained within its macropores having a diameter greater than 1,000 angstroms. It is more desirable that greater than 28 percent of the total pore volume to be contained within the macropores having a diameter greater than 1,000 angstroms, and, most desirable, greater than 30 percent of the total pore volume to be contained within the macropores having a diameter greater than 1,000 angstroms.

The percentage of total pore volume of the catalyst that is contained its pores having a diameter greater than 250 Å is greater than 30%, preferably, greater than 34%, and more preferably, greater than 36%.

In preparing the calcined particle of the disclosure the starting materials are mixed by co-mulling the components to form a co-mulled mixture. The starting materials in the preparation of the co-mulled mixture, in one embodiment, include a molybdenum compound, a nickel compound, an inorganic oxide material, and the high molecular weight polyacrylamide.

The molybdenum compound is preferably molybdenum trioxide in the form of finely divided particles that may be as a dry powder or as particles in a suspension or slurry.

The inorganic oxide material may be selected from the group consisting of alumina, silica and alumina-silica.

The nickel component is selected from a group of suitable nickel compounds that are capable of being mixed with the other components of the co-mulled mixture that is shaped into a particle.

The co-mulled mixture is formed into particle that is then calcined to form the calcined particle of the disclosure. The nickel component may be nickel in an oxide form, such as nickel oxide, or it may be a nickel salt compound. Nickel salt compounds that may suitably be used include, for example, hydroxides, chlorides, nitrates, and acetates of nickel. One preferred nickel compound used in the preparation of the co-mulled mixture is nickel nitrate.

The high molecular weight polyacrylamide used in forming the co-mulled mixture is a polymer compound capable of providing the catalyst of the disclosure having the high macroporosity characteristics and enhanced catalytic properties described herein. These enhanced catalytic properties include providing for significant conversion of the pitch component of a heavy hydrocarbon feedstock with an associated low sediment yield. The unique, highly macroporous pore structure of the catalyst is believed to contribute to its enhanced catalytic properties. Both the molecular weight of the polymer used in forming the co-mulled mixture and its concentration in the co-mulled mixture are important for providing the final calcined particle having its high macroporosity properties. The critical concentrations of the high molecular weight polyacrylamide required for the co-mulled mixture are described above.

The molecular weight of the polyacrylamide used in making the co-mulled mixture is related to the number of repeat units in the high molecular weight polyacrylamide compound and the length of the polymer. The high molecular weight polyacrylamide should have a molecular weight within the range of from 1,000,000 g/mol to 25,000,000 g/mol. The preferred molecular weight of the polyacrylamide is within the range of from 1,000,000 g/mol to 20,000,000 g/mol.

It is theorized that one reason the high molecular weight polyacrylamide works is that it forms a bridge between the alumina particles of the co-mulled mixture which keeps the particles of the co-mulled mixture oriented in a spaced relationship during the mixing, particle or extrudate formation, and calcination to yield the calcined particle of the catalyst composition having the high macroporosity characteristics described herein.

Potential high molecular weight polyacrylamide compounds for use in making the composition include polymers having molecular weights within the desired range selected from the group consisting of poly(acrylamide), poly(N-isopropyl acrylamide), poly(N-octyl acrylamide), poly(N-tert-butyl acrylamide, poly(N-phenyl acrylamide), and poly(N-sec-butyl acrylamide). Among these poly(acrylamide) is preferred.

The formation of the co-mulled mixture may be done by any method or means known to those skilled in the art. These include the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include single or double screw extruders, trough-and-screw mixers and pug mills.

The mixing of starting materials of the calcined particle may be conducted for any suitable time-period necessary to properly homogenize the co-mulled mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the co-mulled mixture that is preferably a substantially uniform or homogeneous mixture of the individual components of such co-mulled mixture. This term is intended to be broad enough in scope to include the mixing of the starting materials to yield a paste that exhibits properties making it capable of being extruded or formed into extrudate particles by any of the known extrusion methods. But, also, the term is intended to encompass the mixing of the starting materials to yield a mixture that is preferably substantially homogeneous and capable of being agglomerated into formed particles. Examples of the formed particles include spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

A major portion of the molybdenum source of the calcined particle may be predominantly molybdenum trioxide. In the mixing or co-mulling of the starting materials of the calcined particle, it is preferred for the molybdenum trioxide to be in a finely divided state either as a finely powdered solid or as fine particles in a suspension or slurry. It is best for the particle sizes of the particulate molybdenum trioxide used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm).

The particle size of the molybdenum trioxide used in the manufacture of the calcined particle will generally have a lower limit to its size of greater than 0.2 microns. Thus, the particle size of the molybdenum trioxide used in the formation of the co-mulled mixture in the manufacture of the calcined particle is preferably in the range of from 0.2 to 150 μm, more preferably, from 0.3 to 100 μm, and, most preferably, from 0.5 to 75 μm. Typically, the size distribution of the molybdenum trioxide particles, whether in a dry powder or a suspension or otherwise, is such that at least 50 percent of the particles have a maximum dimension in the range of from 2 to 15 μm.

Once the starting materials of the calcined particle are properly mixed and formed into the shaped or formed particles, a drying step may advantageously be used for removing certain quantities of water or volatiles that are included within the co-mulled mixture or formed particles.

The drying of the formed particles may be conducted at any suitable temperature for removing excess water or volatiles, but, preferably, the drying temperature will be in the range of from about 75° C. to 250° C. The time-period for drying the particles is any suitable period of time necessary to provide for the desired amount of reduction in the volatile content of the particles prior to the calcination step.

The dried or undried particles are calcined in the presence of an oxygen-containing fluid, such as air, at a calcination temperature that provides a final calcined particle having the required pore structure and enhanced catalytic properties that are described herein. The dried particle of the disclosure is calcined at a temperature is in the range of from 677° C. (1250° F.) to 843° C. (1550° F.). The preferred calcination temperature is in the range of from 704° C. (1300° F.) to 815° C. (1500° F.), and, more preferred, from 746° ° C. (1375° F.) to 774° C. (1425° F.).

The calcined particle is particularly useful as a high activity hydroprocessing catalyst for use in the hydroprocessing of a heavy feedstock stream that has high contents of pitch, organic metals such as nickel and vanadium compounds, and sulfur. Prior to its use, the calcined particle may, but is not required to, be sulfided or activated by any of the methods known to those skilled in the art. Generally, in its use in the hydroprocessing of a heavy hydrocarbon feedstock, the calcined particle is contained within a reaction zone, such as that which is defined by a reactor vessel, wherein a heavy hydrocarbon feedstock is contacted with the calcined particle under suitable hydroprocessing reaction conditions and from which a treated hydrocarbon or heavy hydrocarbon conversion product is yielded.

The heavy hydrocarbon feedstock of the process disclosed herein may be derived from any of the high boiling temperature petroleum cuts such as atmospheric tower gas oils, atmospheric tower bottoms, vacuum tower gas oils, and vacuum tower bottoms or resid.

It is a particularly useful aspect of the disclosed process to provide for the hydroprocessing of a heavy hydrocarbon feedstock that is generally defined as having a boiling temperature at its 5% distillation point, i.e. T(5), that exceeds 300° C. (572° F.) as determined by using the testing procedure set forth in ASTM D-1160. The disclosure is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavier hydrocarbons that have boiling temperatures above 538° C. (1,000° F.). These heavier hydrocarbons are referred to herein as pitch, and, as already noted, it is recognized that one of the special features of the disclosed catalyst or process is that it is particularly effective in the hydroconversion of the pitch content of a heavy hydrocarbon feedstock.

The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

The heavy hydrocarbon feedstock further may include a significantly high sulfur content. One of the special features of the disclosure is that it provides for the desulfurization and demetallization of the heavy hydrocarbon feedstock. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the disclosure is that it provides for the desulfurization of the heavy feedstock having a significantly high sulfur content. Such a sulfur content is typically much greater than 1 weight percent, so as to provide for a treated hydrocarbon product or a heavy hydrocarbon conversion product having a reduced sulfur content, such as a sulfur content of less than 1 weight percent, preferably, less than 0.75 wt. %, and, more preferably, less than 0.5 wt. %.

When referring herein to the sulfur content of either the heavy hydrocarbon feedstock or the treated hydrocarbon or heavy hydrocarbon conversion product, the weight percents are determined by the use of testing method ASTM D-4294.

The disclosed process is particularly useful in the processing of a heavy hydrocarbon feedstock that has a sulfur content exceeding 2 weight percent, and with such a heavy hydrocarbon feedstock, the sulfur content may be in the range of from 2 to 8 weight percent. The catalyst and process disclosed herein are especially useful in the processing of a heavy hydrocarbon feedstock having an especially high sulfur content of exceeding 3 or even 4 weight percent and being in the range of from 3 to 7 weight percent or even from 4 to 6.5 weight percent.

The process utilizes the high macroporosity catalyst disclosed herein in hydroprocessing heavy hydrocarbon feedstocks to provide for simultaneous desulfurization, denitrogenation, and pitch conversion with a reduced or low sediment yield. In this process, the heavy hydrocarbon feedstock is contacted with the catalyst under suitable hydrodesulfurization and hydroconversion process conditions to yield the heavy hydrocarbon conversion product.

The nickel content of the heavy hydrocarbon feedstock is typically in the form of organic nickel compounds. The nickel concentration of the heavy hydrocarbon feedstock can be in the range of from 2 ppmw to 250 ppmw. More typically, the heavy hydrocarbon feedstock of the disclosed process has a concentration of nickel that is in the range of from 5 ppmw to 225 ppmw, and, most typically, the nickel concentration is in the range of from 7 ppmw to 200 ppmw.

The heavy hydrocarbon feedstock may also have a vanadium concentration that typically is in the range of from 5 ppmw to 250 ppmw. It is desirable for the heavy hydrocarbon feedstock to contain as little vanadium as possible, but, the composition provides for demetallization, and, thus, the removal of vanadium from the heavy hydrocarbon feedstock. More typically, the vanadium concentration of the heavy hydrocarbon feedstock is in the range of from 10 ppmw to 225 ppmw.

The heavy hydrocarbon conversion product should have a reduced sulfur content that is below that of the heavy hydrocarbon feedstock. The reduced sulfur content is preferably a sulfur concentration of less than 1 weight percent. It is recognized that the disclosed process, however, may have the capability of effectively desulfurizing the heavy hydrocarbon feedstock to provide a treated hydrocarbon or heavy hydrocarbon conversion product having a reduced sulfur content of less than 0.5 and even less than 0.4 weight percent of the heavy hydrocarbon conversion product.

The sediment typically yielded with the heavy hydrocarbon conversion product is less than 0.5 wt. %, and, preferably, it is less than 0.4 wt. % as determined by testing method ASTM-4870. The process disclosed herein, with its use of the high macroporosity hydroprocessing catalyst provides a heavy hydrocarbon conversion product having significantly lower sediment content than provided by comparative catalysts. The sediment content of the heavy hydrocarbon conversion product can even be less than 0.35 wt. % or less than 0.3 wt. % of the heavy hydrocarbon conversion product.

The calcined particle (high macroporosity catalyst) of the disclosure may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems.

The catalyst of the present disclosure is particularly useful as an ebullating bed catalyst used in ebullated bed reactor systems. The ebullated bed reactor system is described in greater detail with respect to the FIG.

Another suitable reactor system is that which includes a fixed bed of the disclosed catalyst contained within a reactor vessel. The reactor vessel is equipped with a reactor feed inlet means, such as a feed nozzle, for introducing the heavy hydrocarbon feedstock into the reactor vessel, and a reactor effluent outlet means, such as an effluent outlet nozzle, for withdrawing the reactor effluent or the heavy hydrocarbon conversion product from the reactor vessel.

The process generally operates at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig). The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the process is generally such as to provide a liquid hourly space velocity (LHSV) in the range of from 0.01 hr$^{-1}$ to 3 hr$^{-1}$. The term "liquid hourly space velocity", as used herein, means the numerical ratio of the rate at which the heavy hydrocarbon feedstock is charged to the reaction zone of the process in volume per hour divided by the volume of catalyst contained in the reaction zone to which the heavy hydrocarbon feedstock is charged. The preferred LHSV is in the range of from 0.05 hr$^{-1}$ to 2 hr$^{-1}$, more preferably, from 0.1 hr$^{-1}$ to 1.5 hr$^{-1}$ and, most preferably, from 0.2 hr$^{-1}$ to 0.7 hr$^{-1}$.

It is preferred to charge hydrogen along with the heavy hydrocarbon feedstock to the reaction zone of the process disclosed herein. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The FIG. presents a simplified schematic representation of an ebullated bed reactor system 10 in which the high macroporosity catalyst of the present disclosure is used. The ebullated bed reactor system includes elongated vessel 12 that defines several zones such as a contacting zone for contacting a heavy hydrocarbon feedstock under suitable hydroconversion reaction conditions with the high macroporosity catalyst and a separation zone for the separation of a hydrotreated heavy hydrocarbon product from the high macroporosity catalyst.

Within elongated vessel 12 is a settled high macroporosity catalyst bed 14 having a settled high macroporosity catalyst bed level 16. A reactor feed comprising heavy hydrocarbon feedstock and hydrogen is introduced into lower zone 17 located below the ebullated catalyst bed within elongated vessel 12 by way of conduit 18.

The reactor feed passes through horizontal distributor plate 20 that provides means for directing the reactor feed upwardly and through settled high macroporosity catalyst bed 14. The passing of the reactor feed through settled high macroporosity catalyst bed 14 serves to lift and to expand the bed of high macroporosity catalyst to thereby provide an expanded high macroporosity catalyst bed 22 (ebullated catalyst bed) having an expanded high macroporosity catalyst bed level 24.

In separation zone 26 of elongated vessel 12, high macroporosity catalyst is separated from liquid hydrocarbon 28, having a liquid level 30, and the heavy hydrocarbon conversion product, which passes from elongated vessel 12 by way of conduit 32.

Downcomer 34 within elongated vessel 12 provides conduit means for recycling the liquid hydrocarbon 28 to the bottom of expanded high macroporosity catalyst bed 22. Conduit 36 is operatively connected in fluid flow communication between downcomer 34 and ebullating pump 38. Ebullating pump 38 provides means for recycling and circulating the liquid hydrocarbon 28 through expanded hydroconversion catalyst bed 22.

The upper end of elongated vessel 12 includes catalyst inlet conduit means 40, which provides for the introduction of fresh high macroporosity catalyst while ebullated bed reactor system 10 is in operation. Fresh high macroporosity catalyst can be introduced into elongated vessel 12 through conduit means 40 by way of conduit 42. The lower end of elongated vessel 12 includes catalyst outlet conduit means 44, which provides for the removal of spent high macroporosity catalyst while ebullated bed reactor system 10 is in operation. The spent high macroporosity catalyst passes from elongated vessel 12 by way of conduit 46.

The following examples further illustrate the present disclosure, but they are not to be construed as limiting the scope of the embodiments disclosed herein.

Example I

This Example I illustrates the method of preparation and catalyst composition of the disclosed catalyst and of a comparison catalyst.

Inventive Catalyst Composition

An embodiment of the disclosed catalyst composition was prepared by combining 932.2 grams of alumina powder, having an LOI of 23.9%, with 20 grams of a high molecular weight polyacrylamide component (Tramfloc® 133 M nonionic flocculant), 210.7 grams of catalyst fines (finely ground alumina, molybdenum oxide and nickel oxide powder), 75.2 grams of molybdenum trioxide, and 78.8 grams of nickel nitrate in a muller. The muller was operated for about a minute before adding a mixture of 1354.5 grams of water and 29.4 grams of 68% nitric acid. The mix was mulled for 10 minutes and then 20 grams of lower molecular weight cationic dispersant were added, and the mixture mulled for 15 additional minutes. The mixed material was extruded using a screw extruder to make cylindrical pellets. The extruded material was dried in an oven for 1 hour at 250° F. This material was calcined in a muffle furnace at 1390° F. to 1415° F. temperature for one hour. The metal loadings of the final catalyst included 2.9 wt. % nickel and 12.1 wt. % molybdenum, both of these values are on an oxide basis.

Comparison Catalyst Composition

The comparison catalyst composition was prepared by mixing in a muller mixer 2721.6 parts (2049.4 on a dry basis) alumina powder and 594.3 parts (563.5 on a dry basis) finely ground alumina, molybdenum oxide and nickel oxide powder with a molybdenum component mixture of 539.1 parts ammonium heptamolybdate (27% MoO$_3$) and 1406.2 parts water and a nickel component mixture of 333.3 parts nickel nitrate solution, 81.1 parts 70% nitric acid and 1406.2 parts water. The components where mulled for 30 minutes followed by the addition of 14.1 parts flocculant (Superfloc LMW 300) followed by 5 minutes of mixing. The co-mulled mixture was then extruded into extrudates that were dried in air at an approximate temperature of 250° F. for about 1 hour. Thereafter, the dried extrudates were calcined in air for 1 hour at a temperature of 1370° F. The metal loadings of the final catalyst included 3.0 wt. % nickel and 9.0 wt. % molybdenum, both of these values are on an oxide basis.

The following Table 1 presents the pore structure properties of the inventive catalyst and the comparison catalyst.

TABLE 1

Pore Structure Properties of Inventive and Comparison Catalysts

| | Inventive Catalyst | Comparison Catalyst |
|---|---|---|
| >250 Å | >35% of TPV | <25% of TPV |
| >1,000 Å | >30% of TPV | <10% of TPV |
| >5,000 Å | >20% of TPV | <5% of TPV |

TABLE 1-continued

Pore Structure Properties of Inventive and Comparison Catalysts

|  | Inventive Catalyst | Comparison Catalyst |
|---|---|---|
| >TPV (cc/g) | >0.95 | <0.82 |
| >nitrogen surface area | >250 | <250 |

*Total Pore Volume (TPV)

Example II

This Example II describes the conditions of the performance testing of Comparison Catalyst and Inventive Catalyst and the results of the performance testing.

The catalysts were tested in a 2-stage CSTR pilot plant. The properties of the food are summarized in Table 2, and the process conditions are presented in Table 3.

TABLE 2

Properties of the feed used to evaluate the catalysts

| PROPERTY | VALUE |
|---|---|
| 1000 F.+, wt % | 87.7 |
| SULFUR, wt % | 5.255 |
| MCR, wt % | 20.8 |
| NICKEL, wppm | 43 |
| VANDIUM, wppm | 130 |
| FEED DENSITY, g/ml | 1.0347 |
| n-C7 Insolubles, wt % | 12.7 |
| n-CS Insolubles, wt % | 20.9 |

TABLE 3

Process conditions used to evaluate the catalysts

| Catalyst LHSV, hr$^{-1}$ | 0.55 |
|---|---|
| Total pressure, psia | 2250 |
| H2/Oil Ratio, scft/bbl | 4090 |
| Temperature, ° F. | 795 |

The performance of Inventive Catalyst relative to the performance of Comparison Catalyst (Base) summarized in Table 4.

TABLE 4

Relative performance of the catalysts

|  | Comparison Catalyst | Inventive Catalyst |
|---|---|---|
| Sulfur Conversion, wt. % | 100 | 103 |
| 968 F+ Conversion | 100 | 112 |
| 698 F+ Fraction Sediment (ASTM D 4870) | 100 | 65 |

A review of the performance results presented in Table 4 show that the conversion and desulfurization catalytic performance of the Inventive Catalyst is better than those of the Comparison Catalyst. The Inventive Catalyst further provides for a huge improvement in sediment yield (i.e., reduction in sediment yield) as compared to the Comparison Catalyst. The Inventive Catalyst unexpectedly provides for 65% of the sediment yield provided by the Comparison Catalyst. Thus, giving a 35% reduction in sediment yield over that provided by the Comparison Catalyst. These results show that the catalyst of the present disclosure, with its unique pore structure and high macroporosity, made using a high molecular weight polyacrylamide, unexpectedly provides for a low sediment yield while providing material improvements in conversion and desulfurization.

I claim:

1. An ebullating bed catalyst, comprising:
a calcined particle comprising:
alumina in the range of from 70 to 92.5 wt. % based on the weight of the ebullating bed catalyst;
a molybdenum component in an amount greater than 5 wt. %, calculated as metal and based on the weight of the ebullating bed catalyst; and
a nickel component in an amount such that the ebullating bed catalyst has an atomic ratio of nickel-to-molybdenum in the range of from 0.2 to 0.9, wherein the ebullating bed catalyst has a high macroporosity pore structure such that at least 18% of a total pore volume of the ebullating bed catalyst is in pores of a diameter greater than 5,000 Å, at least 25% of the total pore volume of the ebullating bed catalyst is in pores of a diameter greater than 1,000 Å; and
a bimodal pore size distribution defined as having a first pore diameter peak within the range of from 40 Å to 100 Å and a second pore diameter peak in the range of from 5,000 Å to 11,000 Å.

2. The ebullating bed catalyst of claim 1, wherein from 50 to 70% of the total pore volume of the ebullating bed catalyst is in pores in the range of pore diameters of from 50 Å to 200 Å and from 18 to 60% of the total pore volume of the ebullating bed catalyst is pores in the range of pore diameters of from 5,000 Å to 11,000 Å.

3. The ebullating bed catalyst of claim 1, comprising molybdenum in an amount greater than 5 wt. % and less than 15 wt. %, calculated as metal and based on the weight of said ebullated bed catalyst, and nickel such that the atomic weight ratio of nickel-to-molybdenum is in the range of from 0.2 to 0.9.

4. The ebullating bed catalyst of claim 3, comprising a nickel content in the range of from 0.5 wt. % to 5 wt. %.

5. The ebullating bed catalyst of claim 1, having a nitrogen surface area of greater than 250 m$^2$/g.

6. The ebullating bed catalyst of claim 1, wherein at least 34% of the total pore volume of the ebullating bed catalyst is in pores of a diameter greater than 250 Å.

* * * * *